Feb. 22, 1944.    J. SEIB    2,342,305
JOINT
Filed Nov. 30, 1940
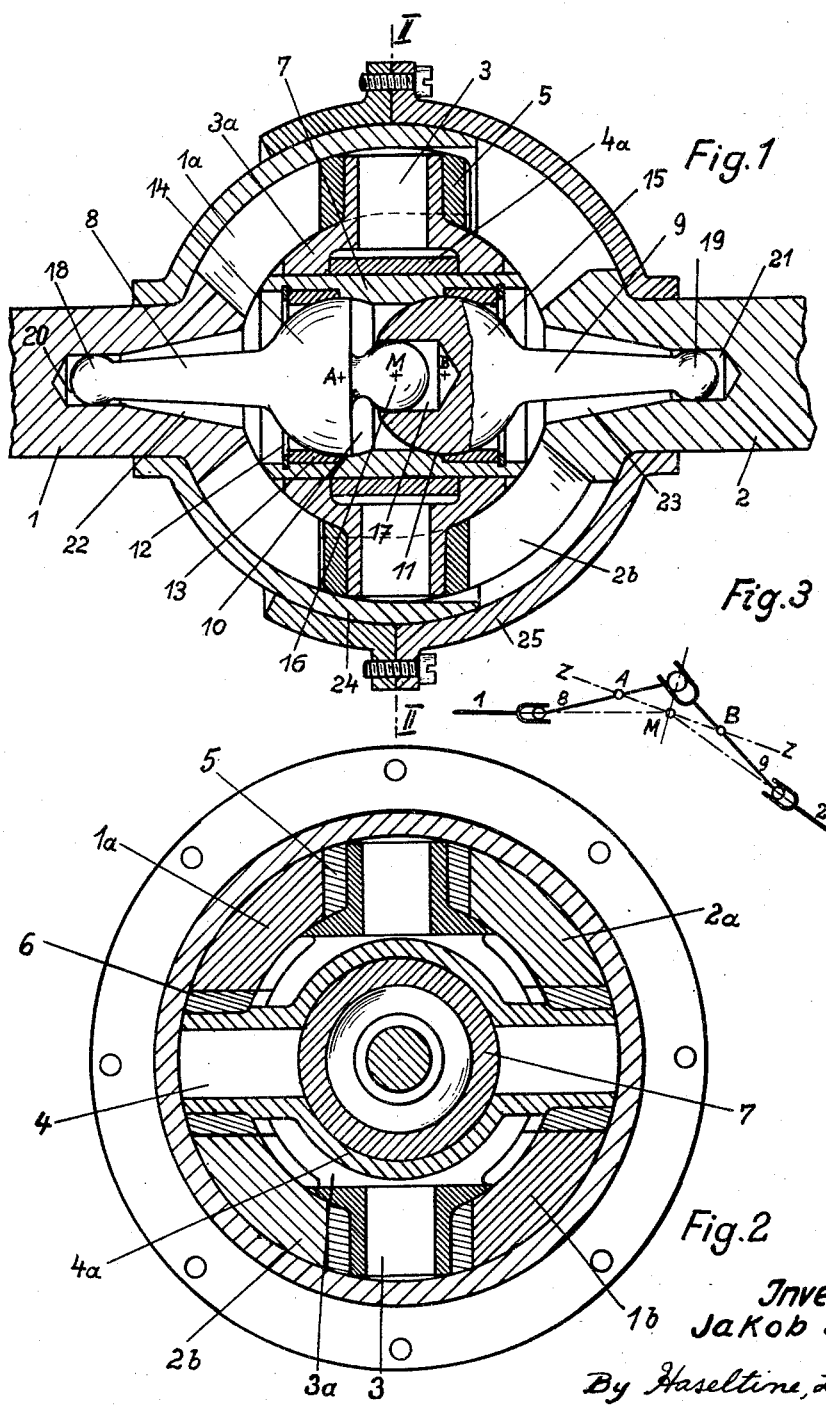
Inventor:
Jakob Seib
By Haseltine, Lake & Co.
Attorneys.

Patented Feb. 22, 1944

2,342,305

UNITED STATES PATENT OFFICE 2,342,305

JOINT

Jakob Seib, Suhl, Germany; vested in the Alien Property Custodian

Application November 30, 1940, Serial No. 368,023
In Germany November 30, 1939

4 Claims. (Cl. 64—21)

The invention relates to joints for connecting two shafts or shaft parts which are relatively swivelled as, for example, for vehicles, especially automotive vehicles and an object of the invention is to provide a joint which is simple in construction and easy to manufacture.

A universal joint for shafts is known in which one of the shafts is provided with a yoke-shaped member or spherical end portion adapted to couple or to work between or around a corresponding end portion of the other shaft and in which the ends of the two shafts are coupled or connected together by means of one or several drivers which are positively held with their axes in a plane of symmetry of the joint bisecting the angle enclosed by the two shafts by means of a control member, the said control member being operatively connected to both shafts by two symmetrically arranged control levers. In this case the two control levers may be rigidly secured to the control member and movably connected to both shafts or the said control levers may be rigidly fixed to the shafts and movably connected to the control member respectively.

In these known joints the controlling member for the drivers during the operation carries out shifting movements with respect to the centre of the joint in the direction of the plane of symmetry of the joint in such a manner that a transfer of the control forces can be made only by means of disks or washers which laterally grip the driver system. As, however, during the operation there does not appear a surface contact, but only nearly a spot or point contact at the extreme edge or rim of the disks, considerable edge pressures are obtained having easily the tendency to result in a breakage.

It is an object of the present invention to provide a joint in which such drawback is avoided.

According to the present invention the controlling member is constructed as a control sleeve penetrating the drivers as an axis and the centre line of which during the operation permanently is passing through the centre of the joint and in which sleeve the two control levers are rotatably mounted with their spherical collars. These control levers are adapted to support one upon the other at their adjacent ends and are in slidable engagement with the two shafts at their opposite ends.

To these ends my invention consists of the parts and combination of parts, as hereinafter described, and more particularly pointed out in the claims at the end of this specification.

In the accompanying drawing wherein corresponding parts are represented by like characters in the various views Figure 1 is a longitudinal sectional view of the joint in its normal position, i. e. if the two shafts are axially aligned.

Figure 2 is a transverse sectional view taken on the line II—II of Figure 1, and Figure 3 illustrates a diagram showing the position of the control members, if the joint is swung out or relatively swivelled.

The present invention is illustrated as embodied in a ball joint for shafts in which the ends of the shafts are provided with yokes adapted to engage or work into each other. In the embodiment shown in the drawing the shaft 1 terminates into a yoke or fork having the two legs 1ª and 1ᵇ entering between the legs 2ª and 2ᵇ of a second yoke or fork provided on the other shaft 2 of the joint. The coupling of the two yokes and therefore of the two shafts is effected by means of drivers 3 and 4 passing through the joint and which with their enlarged middle or centre portions 3ª and 4ª respectively are put crossways into each other in such a manner that their axes in the plane passing therethrough are adapted to turn about the centre M of the joint.

The two drivers or driver bolts 3 and 4 are adapted to engage by means of rollers 5 and 6 respectively with the oppositely arranged parallel bearing surfaces of two adjacent legs of one or the other yoke of the shafts (Figure 2).

A sleeve 7 is passed through the two drivers 3 and 4 and serves to form the axis of the said drivers, the said sleeve 7 being adapted to form simultaneously the control member for the drivers and is connected with the two shafts by means of two club-shaped control levers 8 and 9 in such a manner that in the operation the drivers with their axes are held in the usual manner in the plane of symmetry of the joint, i. e. in a plane lying vertically to the axes of both shafts and bisecting the angle enclosed by the said shafts.

The sleeve 7 is provided on its inner side with two spherical bearings 10 and 11 symmetrically arranged with respect to the middle plane of the driver system and each of which is formed partly by the sleeve 7 itself and partly by an insert member 13 held in its place by a spring ring 12 or the like.

The control lever 8 is provided on one end with a ball-shaped collar 14 adapted to freely turn or swivel in a bearing 10 of the sleeve 7 and the other control lever 9 is also provided on one end with a ball-shaped collar 15 adapted to freely turn or swivel in another bearing 11 of the sleeve 7. The control lever 8 is further provided with a spherical head 16 adapted to enter a cylindrical bore or recess 17 of the other control lever 9 whereby the said control levers are pivotally connected together and support or rest one upon the other. The opposite free ends 18 and 19 of the said control levers 8 and 9 are pivotally and slidably mounted in cylindrical recesses 20 and 21 of the two shafts 1 and 2 respectively.

When the joint as a whole is swung into an angle which may vary from but a degree or two to a maximum of possibly 30° or more at which shaft 1 will be inclined with respect to shaft 2, it is obvious that the sleeve or control member 7 will be caused by the cross head structure 1a—3a, 3, 4, to occupy an intermediate angular position, as already intimated, and levers 8 and 9 will be shifted out of line about their pivotal centres A and B, respectively. Due to the face that the centres A and B do not coincide with the center M of the outer parts 24 and 25 and of the system, the smaller heads 18 and 19 at the outer ends of levers 8 and 9 will slide a short distance in their recesses or sockets 20, 21 within shafts 1 and 2. For the same reason, the smaller head 16 of lever 8 will slide a short distance in recess or socket 17 within member 11 of lever 9. The mentioned recess, while not very deep are sufficient as the movements of the heads 16, 18 and 19 are quite small when the shafts are inclined with respect to each other so as to cause the levers to swivel, even at the maximum bend or inclination.

As shown in Figure 3 of the drawing the arrangement of the said parts is such that the centre line Z—Z of the control member 7 upon which the centres of motion or pivots A and B of the two control levers 8 and 9 are arranged pass through the centre of the joint in each swinging position thereof.

As the angle between the axis of each shaft and the axis of the corresponding control lever remains small also in a large swinging movement of the joint and, therefore, the conical recesses 22 and 23 in the ends of the shafts may be made in an acute angle, it is not necessary to reinforce or strengthen the said shafts in the range of the control levers whereby it is possible that a joint also permitting a large swinging angle may be enclosed or encased by means of rigid spherical shells 24 and 25.

It will be understood that I do not limit myself to details of construction above set forth, but, on the contrary, that many modifications may be made within the broad scope of my invention.

What I claim and desire to secure by Letters Patent of the United States is as follows:

1. In a joint for the connection of two shafts, the combination of a yoke-shaped member on the end of one shaft provided with a recess and a yoke-shaped member on the end of the other shaft, also provided with a recess, the two yoke-shaped members being adapted to work into each other, a plurality of drivers adapted to couple the two shafts, rollers on the said drivers arranged between the two yokes of the shafts, the said drivers having enlarged centre portions put crossways with respect to each other, a controlling member comprising a sleeve provided on its inner side with spherical bearing surface portions and adapted to penetrate the drivers as an axis and having the centre line thereof during the operation passing permanently through the centre of the joint, and two club-shaped control levers each being provided with a collar having a spherical bearing surface, the said control levers being rotatably mounted in the said controlling sleeve and one control lever being provided at its inner end with a spherical head and at its other end also with a spherical head adapted to slide in the recess of one shaft and the other control lever being provided with a cylindrical recess at its inner end and with a spherical head at its other end adapted to slide in the recess of the other shaft.

2. In a joint for the connection of two shafts, the combination of a yoke-shaped member on the end of one shaft provided with a recess and a yoke-shaped member on the end of the other shaft, also provided with a recess, the two yoke-shaped members being adapted to work into each other, a plurality of drivers adapted to couple the two shafts, rollers on the said drivers arranged between the two yokes of the shafts, the said drivers having enlarged centre portions put crossways with respect to each other, a controlling member comprising a sleeve provided on its inner side with spherical bearing surface portions symmetrically arranged with respect to the middle plane of the driver system and adapted to penetrate the drivers as an axis and having the centre line thereof during the operation passing permanently through the centre of the joint and two club-shaped control levers each being provided with a collar having a spherical bearing surface, the said control levers being rotatably mounted in the said controlling sleeve and one control lever being provided at its inner end with a spherical head and at its other end also with a spherical head adapted to slide in the recess of one shaft and the other control lever being provided with a cylindrical recess at its inner end and with a spherical head at its other end adapted to slide in the recess of the other shaft.

3. In a joint for the connection of two shafts, the combination of a yoke-shaped member on the end of one shaft provided with a recess and a yoke-shaped member on the end of the other shaft, also provided with a recess, the two yoke-shaped members being adapted to work into each other, a plurality of drivers adapted to couple the two shafts, rollers on the said drivers arranged between the two yokes of the shafts, the said drivers having enlarged centre portions put crossways with respect to each other, a controlling member comprising a sleeve provided on its inner side with spherical bearing surface portions, each of which is formed partly by the sleeve itself and partly by an insert member, the said spherical bearing surface portions being adapted to extend into the drivers as an axis and having the centre line thereof during the operation passing permanently through the centre of the joint and two club-shaped control levers each being provided with a collar having a spherical bearing surface, the said control levers being rotatably mounted in the bearings of the controlling sleeve and one control lever being provided at its inner end with a spherical head and at its other end also with a spherical head adapted to slide in the recess of one shaft and the other control lever being provided with a cylindrical recess at its inner end and with a spherical head at its other end adapted to slide in the recess of the other shaft.

4. In a joint for the connection of two shafts, the combination of a yoke-shaped member on the end of one shaft provided with a recess and a yoke-shaped member on the end of the other shaft, also provided with a recess, the two yoke-shaped members being adapted to work into each other, a plurality of drivers adapted to couple the two shafts, rollers on the said drivers are arranged between the two yokes of the shafts, the said drivers having enlarged centre portions put crossways with respect to each other, a controlling member comprising a sleeve adapted to penetrate the drivers as an axis and having the centre line thereof during the operation passing permanently through the centre of the joint and two control levers each being provided with a collar having a spherical bearing surface, the said control levers being rotatably mounted by said collars in said controlling sleeve, and said control levers have portions engaging each other and portions engaging the respective shafts.

JAKOB SEIB.